United States Patent [19]

Murphy

[11] Patent Number: 4,955,459
[45] Date of Patent: Sep. 11, 1990

[54] STRAPLESS WHEEL CHOCKING ASSEMBLY

[75] Inventor: Wayne H. Murphy, Pottstown, Pa.

[73] Assignee: Consolidated Rail Corporation, Philadelphia, Pa.

[21] Appl. No.: 317,009

[22] Filed: Feb. 28, 1989

[51] Int. Cl.⁵ .............................. B60T 3/00; B60P 7/08
[52] U.S. Cl. ......................................... 188/32; 410/10
[58] Field of Search .................... 188/32, 36, 41, 42, 188/43, 111; 410/9, 10, 11

[56] References Cited

U.S. PATENT DOCUMENTS

| | | | |
|---|---|---|---|
| 1,102,773 | 7/1914 | Martin | 410/9 |
| 2,577,330 | 12/1951 | Johnston | 188/32 |
| 3,564,577 | 2/1971 | Blunden et al. | 105/369 |
| 3,685,856 | 8/1972 | Blunden | 280/179 |
| 3,866,542 | 2/1975 | Blunden | 105/368 R |
| 4,343,401 | 8/1982 | Paulyson | 206/577 |
| 4,659,266 | 4/1987 | Thelen et al. | 410/10 |

FOREIGN PATENT DOCUMENTS

| | | | |
|---|---|---|---|
| 3113707 | 10/1982 | Fed. Rep. of Germany | |
| 1229096 | 5/1986 | U.S.S.R. | 188/32 |

Primary Examiner—Duane A. Reger
Attorney, Agent, or Firm—Woodcock Washburn Kurtz Mackiewicz & Norris

[57] ABSTRACT

A chocking system for securing a vehicle to a deck which has a track extending therealong includes a pair of frames mounted on said track for movement along the track and hingedly mounted for swinging movement toward and away from the deck. A wedge is mounted on each of the frames and can be moved toward and away from the track. An L-shaped arm is pivotally mounted at one end on each of said wedges and has a shoe at its other end which can extend over and contact the peripheral surface of a vehicle wheel. The arms are adapted to overlap along their elbows and have means for releasably securing them together with the shoes being over the vehicle wheel. The frames can be lifted away from the deck to provide a clear deck for movement of the vehicles along the deck. With the vehicle in position on the deck, the frames are movable back onto the deck with a wedge being positioned at each side of the vehicle wheel to prevent movement of the vehicle along the deck. The arms are then pivoted to place the shoes over the wheel to lock the wheel against the deck.

12 Claims, 4 Drawing Sheets

STRAPLESS WHEEL CHOCKING ASSEMBLY

FIELD OF THE INVENTION

The present invention relates to a wheel chocking assembly used for immobilizing a vehicle under transport, and, more particularly, to a wheel chocking assembly that does not utilize a flexible strap to secure the vehicle wheel in place.

BACKGROUND OF THE INVENTION

Newly manufactured automobiles are often shipped over long distances in large numbers aboard specially adapted railroad cars. The railroad cars, typically having two and three decks, are coupled together and loaded or unloaded in long lines.

Loading ramps are then connected at one end of the line with bridge-type ramps connecting the respective decks between cars. The automobiles are subsequently driven aboard the railroad cars, at speeds which often approach twenty miles per hour, and loaded front to back, top to bottom with overhead and bumper-to-bumper clearances rarely exceeding three inches. Ideally, the automobiles arrive at their destination free from defect and ready for sale. As is more often the case, however, they are damaged in transit for a variety of reasons.

Automobiles, like all other freight which is shipped by rail, are subjected to many interactive forces. One such set of forces is caused by slack that is necessarily left when coupling railroad cars to compensate for sags and dips and cresting in the track. These forces, referred to as "buff" and "draft", described respectively the compressive and tensile coupling forces which cause a jerky relative movement between the cars known as "run-in" and "run-out". Another fundamental problem, "rock and roll", occurs because of uneven or rough track, bridges, and grade crossings which set up a resonant rocking condition while the train is in motion. For a detailed discussion of these and other forces, such as yard impacts, which have necessitated various protective measures as described herein below, see TRACK TRAIN DYNAMICS: TO IMPROVE FREIGHT TRAIN PERFORMANCE (2nd Ed.), Report R-185 of the Association of American Railroads, the contents of which is incorporated herein by reference.

One of the earliest methods used to secure an automobile to the deck of a transport, such as a railroad car, was to forcibly restrain each of the automobile's four corners to some means, such as parallel channels, extending along the length of the transport deck. See, for example, U.S. Pat. No. 3,685,856 to Blunden which discloses a vehicle tie-down for haul-away trailers. One major drawback to such methods, nevertheless, was their inability to accommodate varying sizes of automobiles. That is, different makes and styles of automobiles required different lengths of chains and different means for attaching those chains to the automobiles. A more adaptable system was, therefore, desirable. Another problem associated with such methods was the fact that the parallel channels situated along the length of the railroad car deck and to which the tie-down chains are attached form an obstruction to the entry and exit of automobiles. A system which eliminated such channels would, of course, be desirable.

Various improvements to the above-described apparatus, such as those disclosed by U.S. Pat. Nos. 3,564,577 to Blunden et al and 3,866,542 to Blunden, provided carriage means or shoes which were slidably mounted within the channels extending lengthwise of the railroad car, thus yielding some measure of adaptability in securing various sizes of automobiles. Like the simple four-chain method, however, the methods employing such apparatus till subjected the transported automobiles directly to high "G" forces induced by buff and draft, rock and roll, and yard impacts. As a result, automobile manufacturers in order to protect their product had to reinforce the automobile's frame to withstand higher "G" forces than is typically encountered on the highway, and further had to install padeyes, hooks, or other such fixtures upon which the above described apparatus were attached.

In an attempt to alleviate such automobile design problems, it was next proposed to secure the automobile to the transport vehicle by the automobile's tires rather than by its frame, thus advantageously utilizing the automobile's suspension system to absorb the shocks and vibrations of typical railroad operations. One system used straps, either wire cables or woven belts, which would be secured at one end to the transport vehicle deck in front of the tire, lead up and over the top of the tire, and be secured at its other end to the deck of the transport vehicle behind the tire. Such systems, while typically deployed only over the tires along one side of the automobile to preclude having to crawl in an out of the automobile, successfully prevented movement of the automobile in a vertical direction. They were unsuccessful, however, in preventing lateral and longitudinal displacements.

A number of alternative methods were proposed which utilized chocks, both alone and in combination with the straps. Chocks are wedge-shaped apparatus placed immediately in front of and behind a tire to prevent it from moving forward and backward. Chocks used alone were somewhat successful in spite of the often awkward nature of their deployment. Systems which utilized chocks in combination with straps were typically more successful than those using chocks alone, as could be expected. However, in several cases during impact tests simulating railroad car coupling operations, such combination systems either did not prevent the automobile's tires from "climbing" their chocks or were jammed by car movement thus precluding the chock's removal. Moreover, as in each of the above-described prior art methods and apparatus, the chock and strap means which was permanently affixed to the deck of the railroad car, thereby precluding the attainment of an obstruction-free railroad car deck.

The goal of a clear deck was highly preferable from the standpoint of the automobile manufacturers. An obstruction-free deck would not only promote the economically rapid loading and unloading of automobiles onto railroad cars, but also would prevent tire and underbody damage, particularly to the automobile's oil pan and exhaust system.

While directed to a support kit for loading the carrying automobiles as cargo in a standardize, enclosed dry-freight intermodal shipping container, U.S. Pat. No. 4,343,401 to Paulyson discloses a double-decked arrangement which meets some of the above objective. Automobiles are driven onto the upper or track deck and tied down against vertical or longitudinal movement on the tracks by nylon take-up straps extending cross-wise from points of attachment on the bottoms of the automobiles to sidepost mounting tracks. On the container floor, automobiles are secured against longitudinal and lateral movement by specially adapted wheel chocking plates which are mounted as part of the kit to telescoping crossbeams which extend from the conventional sideposts. As can be readily appreciated, however, the Paulyson kit still requires automobile manufacturers to install eyebolts as points of attachment for the nylon take-up straps. Moreover, while requiring no tools for its assembly, the kit is comprised of numerous parts which involve complex and time-consuming assembling. Still further, with the system disclosed by Paulyson, the automobile is restrained by the frame rather than by its tires. As mentioned above, it is desirable to restrain the automobile with its tires because of the additional cushioning provided by the automobile's own suspension system.

One typical approach for freeing up the deck of a transport from obstructions which would be potentially hazardous to automobiles during loading and unloading is disclosed in a German Patent No. DE 31 13707 A1 to Schmidt et al. As disclosed therein, a chock comprised of a triangular frame is hinged to a vehicle loading track such that it may be lifted out of the way for loading and unloading. The frame must still be fitted to the vehicle by bolts, thereby necessitating tools and additional design on the part of the automobile manufacturer.

U.S. Pat. No. 4,659,266 to Thelen et al discloses a wheel chocking assembly in which chocks are mounted on individual frames which are hinged to a track extending along the deck of the loading vehicle so that the chocks may be lifted out of the way for loading and unloading. The frames are movable along the track and the chocks are movable along the frame so that the chocks can be readily moved to position them behind and in front of the wheels of the automobiles. This can be done without the need of any special tools. Thus the chocks can be used for securing a wide variety of automobiles. However, one disadvantage of this chocking system is that it uses a flexible strap secured between the chocks and extending over the automobile tire. The attachment of the flexible strap requires additional handling and the strap is subject to being damaged, either by being worn or cut, during its use. Therefore, it would be desirable to have a chocking system which like the Thelen et al system, provides for a clear deck for loading and unloading automobiles, can be assembled against the wheels of the automobiles quickly and easily without the need of special tools, and can be used with a wide variety of automobiles, but which does not use a flexible strap.

SUMMARY OF THE INVENTION

An apparatus for securing an automobile to a deck includes a track secured to and extending along the deck. A pair of chocking wedges are mounted on said track for movement along the track to position the wedges on opposite sides of an automobile wheel. The wedges are hingedly mounted on the track for swinging movement between a position on the deck where they can be positioned on opposite sides of the automobile wheel, and a position away from the deck whereby the deck is clear for movement of the automobile. A separate arm is hingedly mounted at one end to each of the wedges for swinging movement along the side of the automobile wheel. Each arm has a shoe on its other end which is adapted to extend across the peripheral surface of the automobile wheel. Means is provided to releasably secure the two arms together with the shoes engaging the peripheral surface of the automobile wheel so that the wheel is held between the wedges and the shoes.

DETAILED DESCRIPTION OF PREFERRED EMBODIMENT

Figure 1:
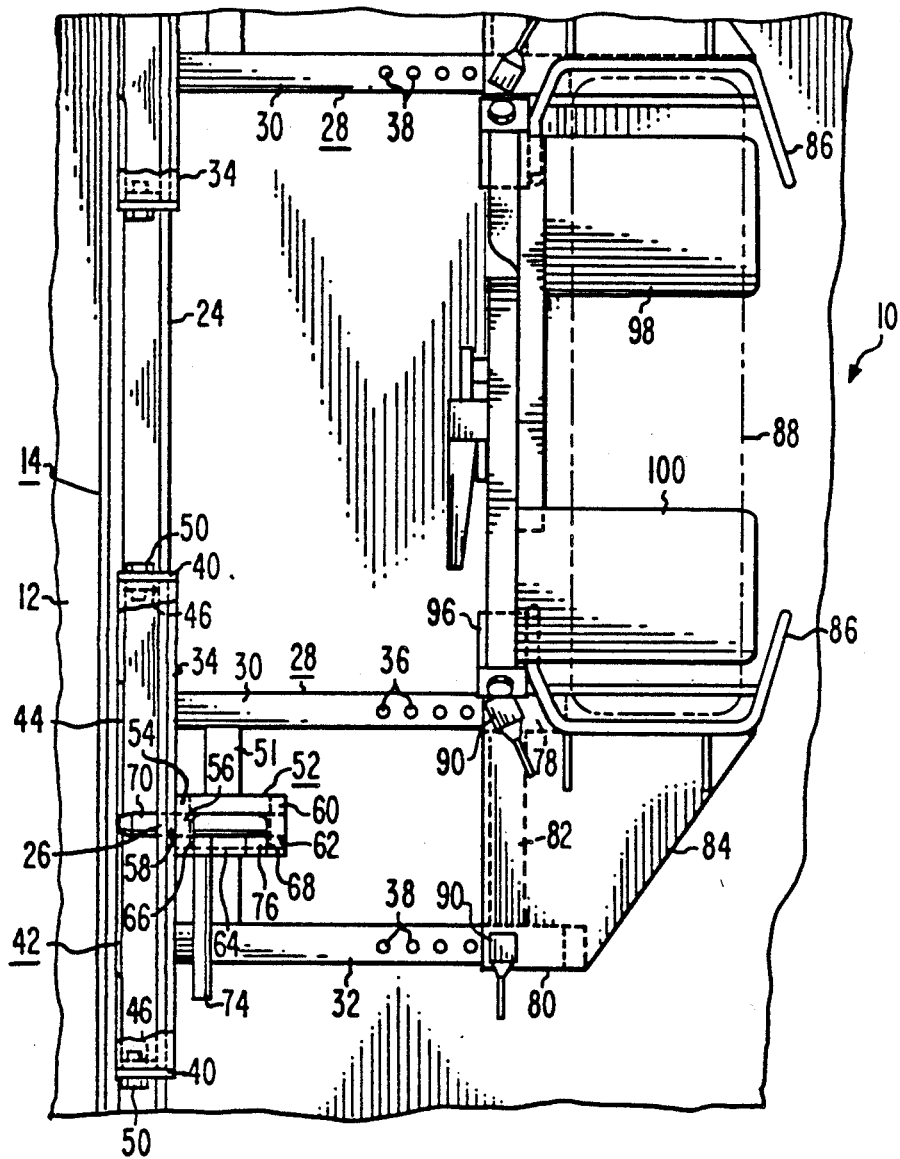
FIG. 1 is a top elevational view of the chocking system of the present invention.
Figure 2:
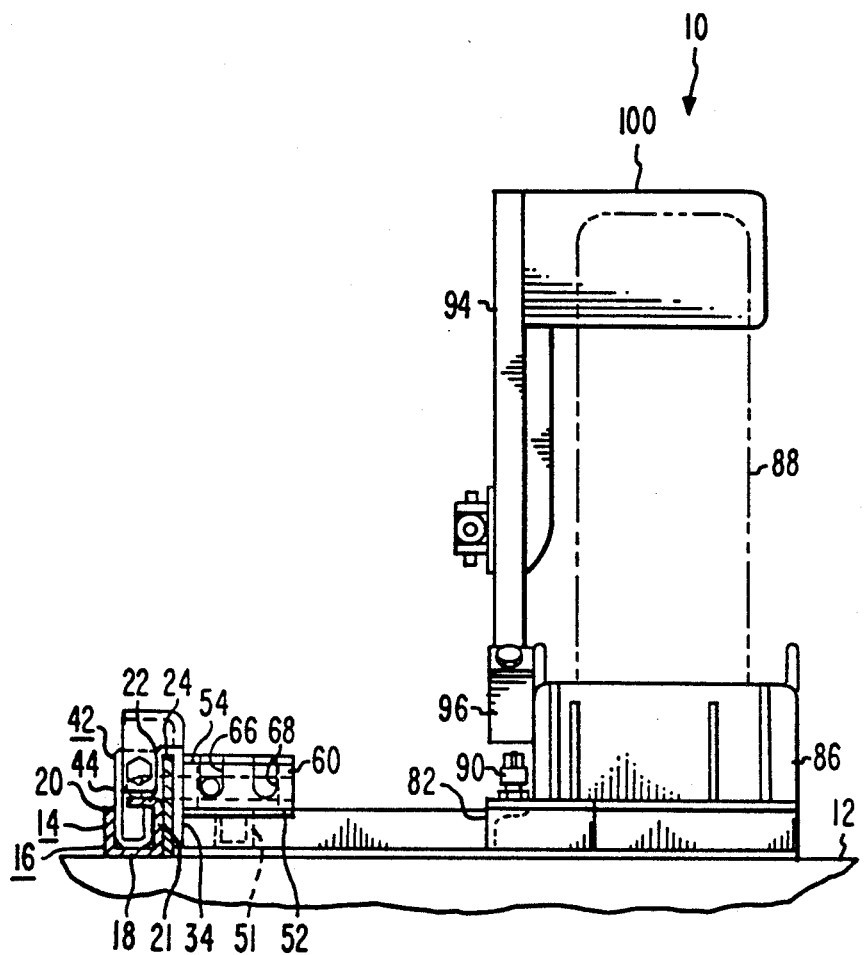
FIG. 2 is an end elevational view of the chocking system.

Referring to the drawings, a chocking system 10 of the present invention is shown installed on the deck 12 of a railroad car for transporting automobiles or other vehicles. A track 14, extends along the deck 12 and includes a U-shaped member 16 having its base 18 on the deck 12 and a pair of arms 20 and 21 projecting upwardly from the base 18. A flange 22 extends from the end of the inner arm 21 partially across the base 18 toward the outer arm 20. A plate 24 is secured to the outer surface of the inner arm 21 and extends upwardly beyond the upper end of the inner arm 21. The plate 24 has a plurality of spaced holes 26 through its portion which projects beyond the upper end of the inner arm 21.

The chocking system 10 includes a pair of frames 28 each including a pair of spaced, parallel, square tubular rods 30 and 32 extending perpendicularly from a support plate 34. The rod 30 is longer than the rod 32, and each of the rods 30 and 32 has a plurality of spaced holes 36 and 38 respectively through its to surface. The support plate 34 extends along the plate 24 of the track 14 and has a flange 40 at each end which extends across the top of the plate 24. A U-shaped guide member 42 slidably fits within the U-shaped track member 16 and has one arm 44 projecting upwardly out of the track member 16. A separate flange 46 extends from each end of the guide member arm 44. The flanges 46 extend across the flanges 40 of the support plate and a hinge pin 50 extends through the overlapping flanges 40 and 46 so that the support plate 34 is hingedly mounted on the guide member 42.

A tubular connecting rod 51 is secured between the rods 30 and 32 adjacent the support plate 34. A trough shaped guide member 52 is mounted on the connecting rod 51 with one end 54 of the guide member 52 being against the support plate 34. The end 54 of the guide member has a hole 56 therethrough which is aligned with a hole 58 in the support plate 34, and the other end 60 of the guide member 52 has a hole 62 therein. A side wall 64 of the guide member 52 has a pair of spaced notches 66 and 68 therein. A pin 70 slidably fits in the guide member 52 and rests in the hole 56 and hole 62 in the ends 54 and 60 respectively of the guide member 52. An operating member 74 is mounted on the pin 70 and when raised to vertical position and moved to notch 68 in side wall 64 the frame 28 can be moved along the track 14. When the frame 28 is in a desired position along the track 14, the pin 70 is slid until it extends through a hole 26 in the plate 24 and the operating arm 74 fits into notch 66 in side wall 64. This locks the frame 28 in position along the track 14.

Tubes 78 and 80, which are of square cross-section, slidably surround the rods 30 and 32 respectively. Tube 78, which surrounds rod 30, is longer than the tube 80, which surround rod 32. The tubes 78 and 80 are connected in spaced parallel relation by an L-shaped plate 82 which extends between one end of each of the tubes 78 and 80. A plate 84 extends between and is secured to the top surfaces of the tubes 78 and 80. A wedge 86 is secured to the side of the longer tube 78 away from the tube 80. The wedge 86 is U-shaped and faces away from the tube 78 so as to receive the wheel 88 of a vehicle. A separate retractable pin member 90 is on the end of each tube 78 and 80 toward the support plate 34. The pin members 90 have pins, not shown, which can be extended through the respective tubes 78 and 80 into one of the holes 36 and 38 in the rods 30 and 32 respectively. This locks the tubes 78 and 80 in position on the rods 30 and 32. The pin members 90 can be operated to retract their pins and thereby allow the tubes 78 and 80 to be slid along the rods 30 and 32 so as to change the position of the wedge 86 along the deck 12.

Figure 3:
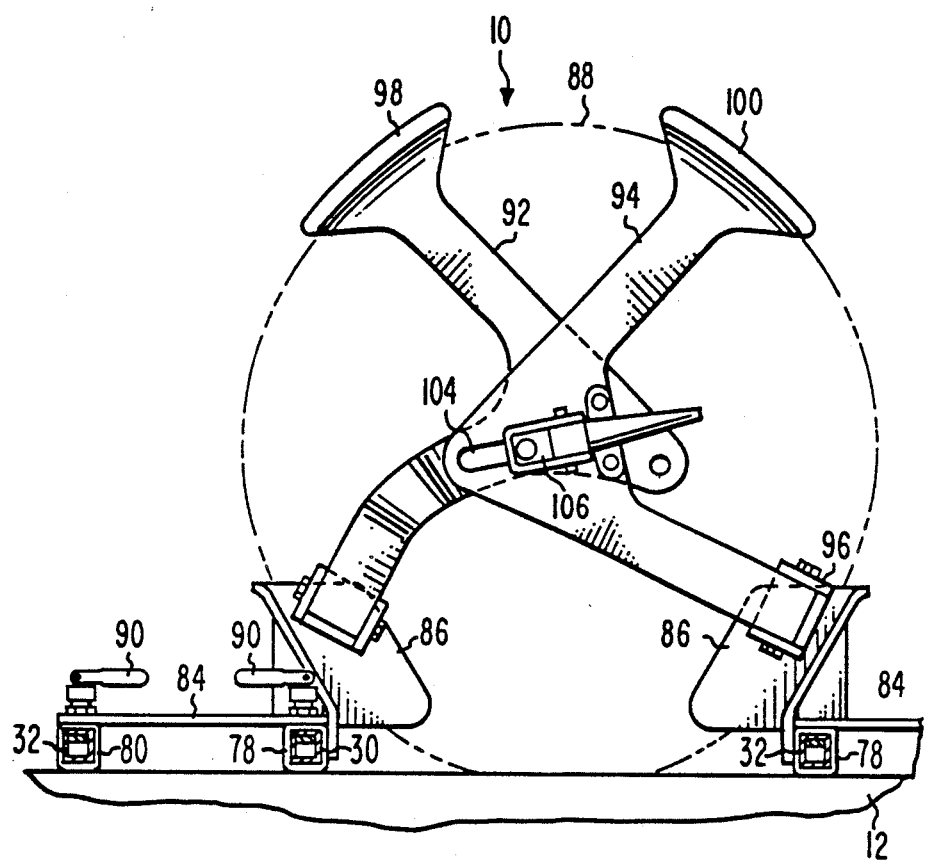
FIG. 3 is a side elevational view of the chocking system secured around an automobile wheel.
Figure 4:
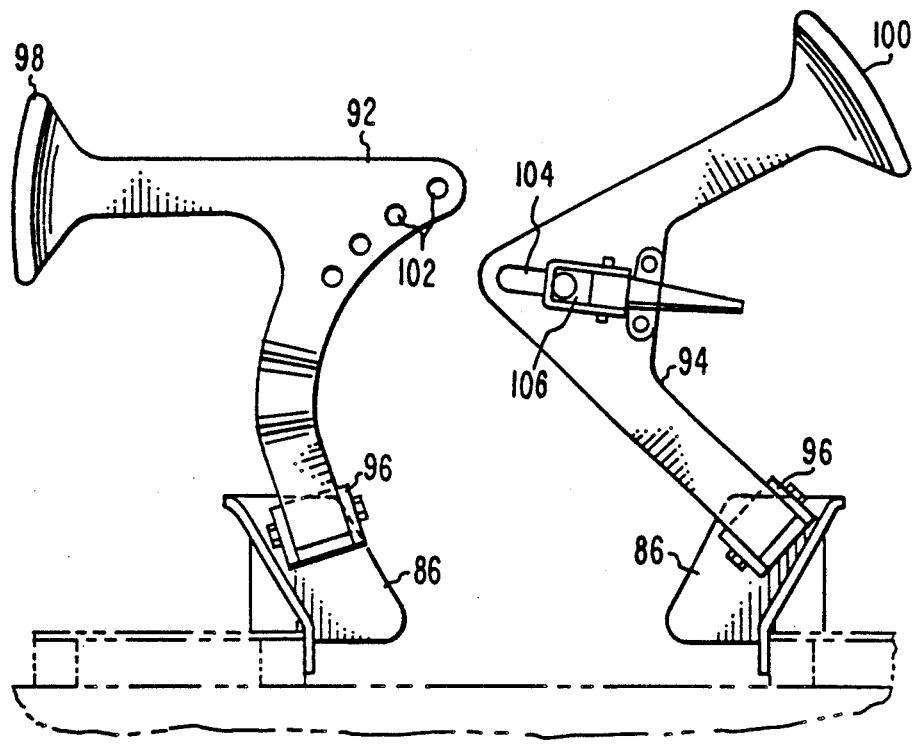
FIG. 4 is a side elevational view of the chocking system with the rods removed from the automobile wheel.

The chocking system 10 includes two frames 28 mounted along the track 14 with their respective wedge members 78 facing each other. L-shaped arms 92 and 94 are pivotally mounted one on each of the wedge members 86 respectively. The arms 92 and 94 are pivotally mounted between the arms of a U-shaped bracket 96, and the base of the bracket is mounted on the side of a respective wedge member 86 by a pivot pin which allows the bracket to rotate therearound. Each arm 92 and 94 has a shoe 98 and 100 respectively extending perpendicularly from its free end so as to be able to extend over the outer surface of the vehicle wheel 88. As shown in FIG. 4, the arm 92 has a plurality of spaced holes 102 therethrough between its elbow and it pivoted end. The arm 94 has an elongated slot 104 therethrough at its elbow, and a retractable pin member 106 is mounted on the arm 94 adjacent the slot 104. When the arms 92 and 94 are in overlapping, crossing relation, as shown in FIG. 3, the pin member 106 can be operated to extend its pin through the slot 104 in the arm 94 and into one of the holes 102 in the arm 92 to lock the two arms 92 and 94 together. The pin member 106 can also be operated to lift its pin out of the hole 102 in the arm 92 and the slot 104 in the arm 94 to allow the two arms 92 and 94 to be pivoted away from each other. The arms 92 and 94 are preferably made of a heavy duty plastic.

In the use of the chocking system 10, the pins 70 are pulled back out of the holes 26 in the track plate 24, and the frames 28 are lifted away from the deck 12 by pivotation around hinge pins 50. This removes the wedges 86 from the deck 12 and clears the deck 12 to allow vehicles to be easily driven onto the deck 12. When the vehicles are in place on the deck 12, the frames 28 are pivoted back onto the deck 12 with a separate frame 28 being on each side of a vehicle wheel 88. By lifting the pins of the retractable pins 90 out of the holes 36 and 38 in the rods 30 and 32, the tubes 78 and 80 can be moved along the rods 30 and 32 until the wedge 86 is aligned with the wheel 88 of a vehicle. The pins of the retractable pins 90 are reinserted through a hole 36 and 38 respectively to lock the wedge 86 in place. The frame 28 is moved along the track 14 until each wedge 86 is seated against an opposite side of the wheel 88. The pins 70 are reinserted through a hole 26 in the track plate 24 to lock each frame 28 in position along the track 14. The arms 92 and 94 are then pivoted across the side of the wheel 88 until their elbow sections overlap and their respective shoes 98 and 100 are over and contacting the outer periphery of the wheel 88 as shown in FIG. 3. The retractable pin member 106 is then operated to insert its pin through the slot 104 in the arm 94 and a hole 102 in the arm 92 and thereby lock the arms 92 and 94 together around the wheel 88.

When the vehicles are to be removed from the deck 12, the above operation is reversed. The retractable pin member 106 is operated to retract its pin from the hole 102 and slot 104, and the arms 92 and 94 are pivoted away from the wheel 88. The pins of retractable pins 90 are lifted out of holes 36 and 38 in the rods 30 and 32 so that the tubes 78 and 80 can be moved along the rods 30 and 32 until the wedge has cleared the automobile body and/or frame. The pins 70 are then retracted from the holes 26 in the track plate 24 and the frames 28 are slid along the track 14 away from the wheel 88. The frames 28 are then lifted away from the deck 12 by pivotation about the hinge pin 50 to lift the wedges 86 away from the deck 12 and thereby clear the deck 12 for removal of the vehicles.

Thus, there is provided by the present invention a chocking system having for a wheel of a vehicle a pair of wedges mounted on frames which are pivotal onto and away from the deck carrying the vehicle. This provides for a clear deck to allow the vehicle to be easily and quickly driven into position on the deck or removed from the deck. The frames are mounted on a track for movement along the track and are easily and quickly movable into position with the wedges engaging opposite sides of the wheel. The arms on the wedges are easily moveable along the side of the wheel with the shoes engaging the periphery of the wheel so as to secure the wheel against the deck. The arms can be placed in position from along the side of the wheel so that the operator does not have to place his arms or hands over the wheel. Also, the arms are of a rigid material so that they are not subject to being torn or damaged in the same manner as a flexible strap used in prior types of chock systems. Although, there has been described a chocking system for one wheel of a vehicle, similar chocking systems can be provided for some or all of the wheels of the vehicle.

What is claimed is:

1. Apparatus for securing a vehicle to a deck comprising:
    a track secured to and extending along said deck;
    a pair of chocking wedges mounted on said track for movement along said track to position the wedges on opposite sides of a vehicle wheel, said wedges being hingedly mounted on said track for swinging movement between a position on said deck where they can be positioned on opposite sides of the wheel and a position away from the deck to provide a clear deck for movement of the vehicle along the deck;
    a separate arm hingedly mounted at one end on each of said wedges for swinging movement along the side of the wheel, each of said arms having a shoe on its other end adapted to extend across the periphery of the wheel; and
    means for releasably securing the arms together with the shoes engaging the peripheral surface of the wheel to hold the wheel between the wedges and the shoes.

2. Apparatus in accordance with claim 1 in which each of said wedges is mounted on a frame which is hingedly secured to a guide member slidable along said track and means for releasably locking the frame to the track at various positions along the track.

3. Apparatus in accordance with claim 2 in which each wedge is mounted on its respective frame for movement toward and away from the track, and means for releasably locking the wedge in a desired position with respect to the track.

4. Apparatus in accordance with claim 3 in which the frame includes a pair of spaced, parallel rods secured to and extending substantially perpendicular from a support plate, said support plate extending along the track and hingedly connected to the guide member which rides on the track.

5. Apparatus in accordance with claim 4 in which the support plate and guide member have overlapping flanges at their ends extending perpendicular to the track, and hinge pins extending through said overlapping flanges to allow the frame to be pivoted with respect to the guide member.

6. Apparatus in accordance with claim 5 including a connecting rod extending between the rods adjacent the support plate, and a pin slidably mounted on said connecting rod for movement toward and away from the support plate, said pin adapted to extend through a hole in the support plate and a hole in the track to secure the frame in position along the track.

7. Apparatus in accordance with claim 4 including a separate tube slidably surrounding each of the rods and connected together for movement along said rods, the wedge is mounted on one of said tubes, and means for releasably connecting the tubes to the rods at various positions of the tubes along the rods.

8. Apparatus in accordance with claim 6 in which the rods have a plurality of spaced holes therethrough and a releasable pin member is on each tube and is adapted to extend its pin into one of the holes in its respective rod to secure the tubes to the rods.

9. Apparatus in accordance with claim 1 wherein each of said arms is L-shaped and the elbow of the arms overlap each other when the shoes are in position over the periphery of the wheel.

10. Apparatus in accordance with claim 9 in which the means for releasably securing the arms together is at the elbows of the arms.

11. Apparatus in accordance with claim 10 in which the means for releasably securing the arms together includes a plurality of spaced holes in one of the arms between the elbow and the pivoted end of said arm, and a releasable pin member on the other arm which is adapted to extend its pin through a slot in the elbow of the other arm and into one of the holes in the one arm.

12. Apparatus in accordance with claim 10 including a U-shaped bracket mounted on each wedge by a pivot pin extending through the base of the bracket, and the one end of each arm is hingedly connected between the arms of a bracket.

* * * * *

UNITED STATES PATENT AND TRADEMARK OFFICE
CERTIFICATE OF CORRECTION

PATENT NO. : 4,955,459

DATED : September 11, 1990

INVENTOR(S) : Wayne H. Murphy

It is certified that error appears in the above-identified patent and that said Letters Patent is hereby corrected as shown below:

Column 2, line 7, "till" should be -- still --;

Column 4, line 37, "to" should be -- top --;

Column 5, line 35, "it" should be -- its --.

Signed and Sealed this

Thirty-first Day of December, 1991

*Attest:*

HARRY F. MANBECK, JR.

*Attesting Officer*      *Commissioner of Patents and Trademarks*